May 20, 1952 L. G. ALEXANDER ET AL 2,597,770
OIL FILTER REPLACEMENT UNIT
Filed Feb. 7, 1949
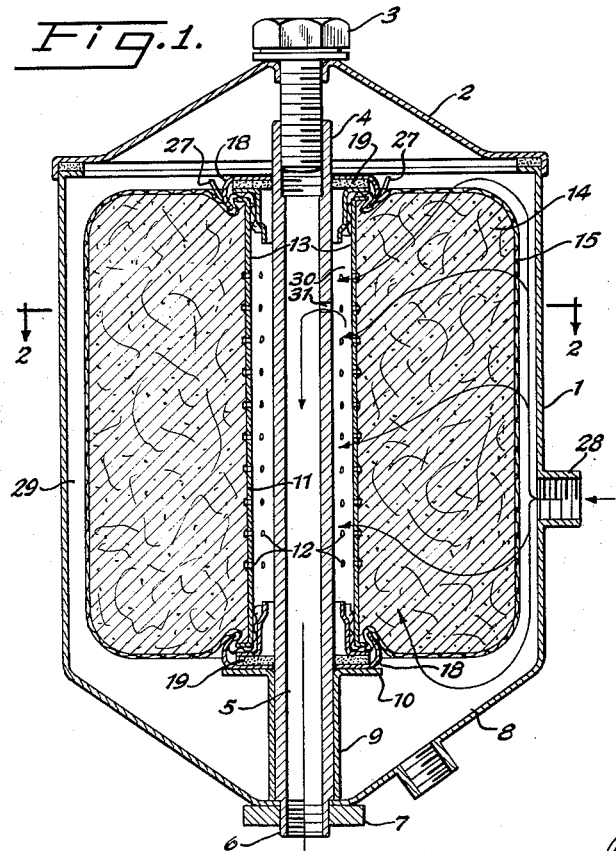
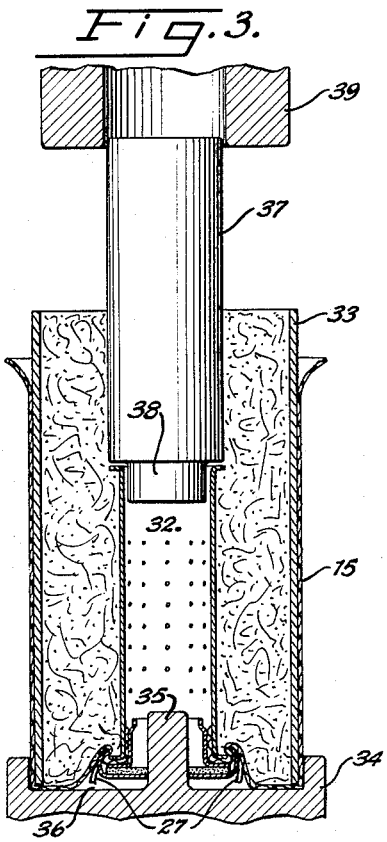
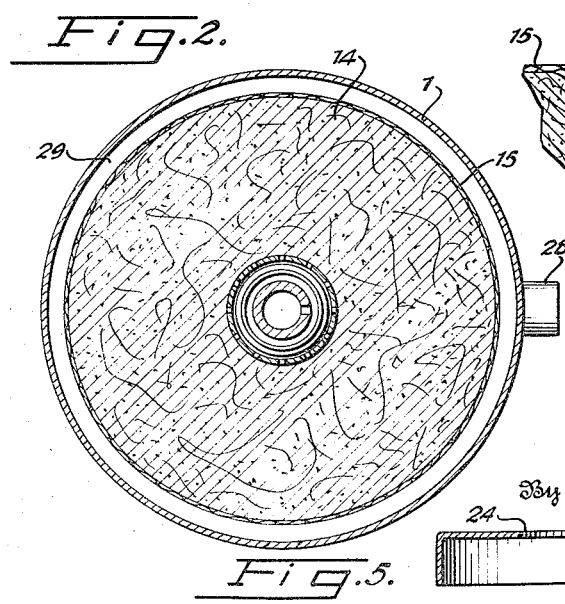
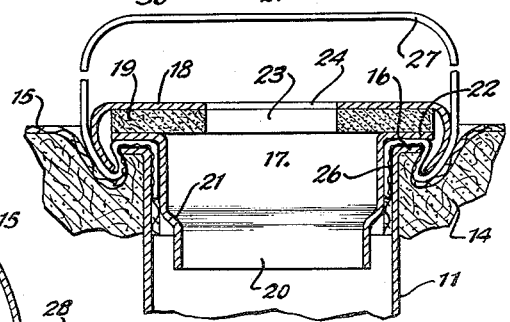
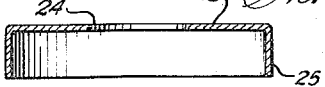
Inventor
LEON G. ALEXANDER.
JAMES W. SHERRILL.
ATTORNEY Patented May 20, 1952

2,597,770

UNITED STATES PATENT OFFICE 2,597,770

OIL FILTER REPLACEMENT UNIT

Leon G. Alexander, Charlotte, and James W. Sherrill, Belmont, N. C., assignors to Wix Accessories Corporation, Gastonia, N. C., a corporation of North Carolina Application February 7, 1949, Serial No. 74,992

3 Claims. (Cl. 210—148)

The invention relates to oil filters, particularly to those in which the filter casing is provided with a center pipe, and also to a novel method of forming replacement units.

An object of the present invention is to improve the construction of oil filter replacement units of the sock type and to provide simple, practical and efficient gasket supporting assemblies adapted to secure the ends of the fabric sock to the upper and lower ends of the center tube and enclosing a permanently mounted gasket extending inwardly beyond the center tube to the center pipe and adapted to close and seal the ends of the intervening space between the center pipe and the center tube.

Heretofore the usual fabric sock has been secured to the ends of the center tube by tucking the sock in between the center tube and the fibrous filtering material. This type of construction did not permit easy application of permanently mounted gaskets and in most cases these gaskets were loosely applied when the filtering replacement unit was installed.

Another object of the present invention is to provide gasket containing and supporting assemblies which, besides affording positive anchorage for both ends of the fabric sock and providing a simple, permanent gasket at each end of the center tube, will also enable a positive locked withdrawal handle to be secured to the replacement unit with no additional parts other than the handle.

A further object of the invention is to provide a novel method of forming the filter replacement unit which will greatly facilitate and speed up production and result in a superior filter replacement unit.

A further object of the invention is to provide a filter replacement unit through which dirty oil from the crank case flows radially inwardly through the filtering material to perforations in the center tube, the dirt contained in the oil being deposited in the fibrous material and the clean oil passing through the perforations to the annular space surrounding the filter center pipe and from the annular space through a metering orifice to the interior of the center pipe out of which it flows back to the crank case, and the center tube having terminal imperforate areas in order to provide a depth of filtering media to take care of oil passing into the end portions of the fibrous filtering element to insure oil leaving the filter in a clean condition without foreign particles.

Another object of the invention is to provide a novel gasket containing and supporting assembly composed of two very inexpensive pieces and adapted to insure efficient and economical manufacture of the filter replacement unit.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a central vertical sectional view of a filter provided with a filter replacement unit constructed in accordance with the present invention;

Fig. 2 is a horizontal sectional view taken on the line 2—2 of Fig. 1;

Fig. 3 is a central vertical sectional view of a mold and means for compressing fibrous filtering material into a filtering element within a fabric sock;

Fig. 4 is an enlarged detail sectional view of the upper end of the filter replacement unit;

Fig. 5 is a detail sectional view illustrating the construction of the closure cap prior to assembly.

In the accompanying drawings, in which is illustrated a preferred embodiment of the invention, the filter replacement unit is shown arranged within a filter casing 1 having a cover 2 secured to the casing 1 by a lock bolt 3 having a threaded engagement with the upper end 4 of a center pipe 5 which is secured at its lower end 6 to the casing 1 by a lock nut 7. The casing 1 is provided at the bottom with an oil sump 8 and the lower end of the center pipe is reduced to form a shoulder for engaging the bottom of the sump which is firmly clamped between the shoulder and the lock nut 7. Within the sump is arranged a tube or sleeve 9 resting upon the bottom of the sump and provided at its upper end with an outwardly extending annular flange 10 which forms a ledge or support for the filter replacement unit, as clearly illustrated in Fig. 1 of the drawings.

The filter replacement unit comprises in its construction a center tube 11 provided with outpricked perforations 12 forming a perforated area which terminates short of the ends of the center tube which is provided with imperforate end portions 13 which provide for a sufficient depth of fibrous filtering material of the filter element 14 to insure complete filtering and cleansing of oil entering the filter replacement unit at the ends of the filter element.

The fibrous filtering material is compressed within a fabric sock 15 by the means hereinafter described, and the ends of the fabric sock are tucked into the upper and lower ends of the center tube over annular end flanges 16 formed integrally with the center tube and extending outwardly therefrom. Each tucked-in end of the fabric sock is securely fastened to the center tube by means of a gasket containing and supporting assembly comprising a tubular cylindrical member 17, a closure cap 18 and a gasket 19. The cylindrical member 17 is inserted into the center tube and within the sock which is secured between the center tube and the cylindrical member which is preferably provided with a reduced inner portion 20 connected with the outer portion of the cylindrical member by a tapered intermediate portion 21. The reduced inner end 20 and the tapered portion 21 facilitate the introduction of the cylindrical member into the tucked end of the sock and into the center tube.

The cylindrical member is provided at its outer end with an outwardly extending annular flange 22. The annular flange 22 extends outwardly beyond the outer periphery of the flange 16 and the gasket 19 which may be constructed of cork or any other suitable material, is arranged upon the flange 22 with its outer periphery flush with the outer edge of the flange 22 and the said gasket extends inwardly over the flange 22 and beyond the same and is provided with a central opening 23 which is of a diameter to snugly receive and fit the center pipe. The gasket covers and seals the space between the center tube and the center pipe at the ends of said intervening space.

The closure cap 18 which is provided with a central opening 24 of a diameter to snugly receive the center pipe is provided with a skirt or flange 25 which is initially cylindrical as clearly illustrated in Fig. 5 of the drawings, and the said skirt or flange is crimped around the flanges of the center tube and the cylindrical member and rigidly secure the cylindrical member, the gasket and the closure cap in position on the end of the center tube, and the end of the sock is also securely fastened to the end of the center tube.

The closure is also adapted to secure the hooked ends 26 of a wire handle 27 to the upper end of the filter replacement unit to enable the latter to be readily removed when necessary to replace a used filter replacement unit with an unused unit. In assembling the handle, the hooked ends are extended into the center tube and the handle is arranged upon the fabric sock adjacent the tucked end of the same and the cylindrical member is then placed in position with its flange arranged upon the handle adjacent the hooked ends thereof and the crimping of the closure cap will securely fasten the handle to the filter replacement unit without the addition of any parts other than the handle.

The filter casing is provided at one side intermediate of the top and bottom thereof with an oil inlet 28 which is connected with the lubricating system of an internal combustion engine and said inlet 28 communicates with an intervening space 29 between the filter replacement unit and the filter casing. The filter replacement unit is arranged in spaced relation with the casing at the sides, top and bottom thereof and dirty oil from the crank case enters the inlet 28 of the filter housing or casing and flows radially inward through the filtering material to the perforations 12 of the center tube. The dirt contained in the oil is deposited in the fibrous filtering material and clean oil passes through the perforations 12 in the center tube to the annular space 30 between the center tube and the center pipe. From this annular space the clean oil passes through a metering orifice 31 to the interior of the center pipe out of which it flows at the lower end back to the crank case. The imperforate end portions 32 of the center tube extend some distance from the ends of the tube in order to provide a depth of filtering media to take care of the oil passing into the end portions of the filter element so that oil entering the filter element at the upper and lower ends thereof will be thoroughly filtered and all foreign elements contained in such oil removed before the oil passes to the perforations of the center tube.

In forming the filter replacement unit when the same is provided with a handle, one end of the fabric sock is tucked into the upper end of the center tube; the hooked ends of the handle are inserted in the center tube and the handle laid upon the fabric sock which extends outwardly over the upper flange of the center tube and the gasket supporting and enclosing assembly unit is applied in the manner before described to securely fasten one end of the fabric sock and the wire handle to the upper end of the center tube.

The center tube, with the fabric sock, is then inverted and the fabric sock is stretched over a mold cylinder 33 and the parts placed in position upon the base 34 of the mold. The base 34 of the mold is provided with an anchoring plug 35 which extends through the center openings of the closure head and the gasket, as clearly illustrated in Fig. 3 of the drawings. The base of the mold is provided with a cylindrical seat 36 which receives the lower end of the mold cylinder 33, the fabric sock and the lower end of the center tube with the attached gasket enclosing and supporting assembly, together with the previously applied wire handle. A bracing plug 37, which is provided with a reduced lower end 38, is engaged with the uppermost end of the inverted center tube and a mass of fibrous filtering material is placed in the space between the mold cylinder and the center tube and plug 37. The necessary pressure for compressing the fibrous material to form a filter unit is applied by means of a cylindrical ram 39 which surrounds the plug 37. After the desired amount of fibrous filtering material is compressed between the mold cylinder and the center tube, the center tube and the sock are removed from the mold and the open end of the fabric sock is closed over the filtering material and is secured to the open end of the center tube in the manner before explained. This completes the formation of the filter replacement unit which is introduced into the filter casing with the wire handle at the top.

It will be seen that both ends of the fabric sock are positively and permanently secured to the ends of the center tube and that permanently mounted seals or gaskets are applied to the ends of the center tube without the use of additional parts and that a positively locked withdrawal handle is also secured to the filter replacement unit with no additional parts other than the handle itself.

The claims of the present application are restricted to the particular form of the invention disclosed herein, the gasket supporting and containing assembly being generically claimed in the application of John D. Wicks and Lloyd N. M. I. Deaver, Serial No. 74,926, filed February 7, 1949, now Patent No. 2,543,481. The claims of the present application, while specific to the form of the invention of the present application, are generic with respect to the subject matter of application of Milford L. Clabaugh, Serial No. 74,883, filed February 7, 1949.

What we claim is:

1. A filter replacement unit including a center tube, a fabric sock having its ends tucked into the ends of the center tube and extending outwardly therefrom over the ends of the tube, and a gasket supporting and containing assembly constituting a portion of and carried by the filter replacement unit and located at each end of the center tube and comprising a tubular cylindrical member extending into the center tube and engaging the tucked-in end of the fabric sock at each end of the latter, an annular closure cap fitted over the cylindrical member and crimped into engagement with the end of the center tube and rigidly securing the tubular cylindrical member to the center tube, and a gasket arranged within the closure cap between the same and the upper end of the cylindrical member and having an opening of a size to fit a center pipe of a filter casing said gasket extending inwardly over the upper ends of the center tube and the cylindrical member to the center pipe and closing and sealing the space between the center pipe and the center tube at each end of the latter when the tube and the pipe are assembled in spaced relation within a filter casing.

2. A filter replacement unit including a center tube provided at its upper and lower ends with outwardly extending flanges, a fabric sock having its ends tucked into the ends of the center tube and extending outwardly therefrom and arranged upon the upper and lower flanges of the center tube, and a gasket supporting assembly constituting a portion of and carried by the filter replacement unit and located at each end of the center tube and comprising a tubular cylindrical member extending into the center tube and engaging the tucked-in end of the fabric sock at each end of the center tube and provided at its outer end with an outwardly extending flange engaging over the adjacent flange of the center tube and the sock arranged thereon, an annular closure cap fitted over the cylindrical member and having a skirt crimped into engagement with the flange of the center tube and rigidly securing the tubular cylindrical member to the center tube, and a gasket contained within the closure cap and clamped between the same and the flange of the cylindrical member and having a central opening of a size to fit a center pipe of a filter casing and extending inwardly over the center tube to the center pipe and closing and sealing the space between the center tube and the center pipe at each end of the center tube when the center tube and the center pipe are assembled in spaced relation within a filter casing.

3. A filter replacement unit including a center tube provided at its upper and lower ends with outwardly extending flanges, a fabric sock having its ends tucked into the ends of the center tube and extending outwardly therefrom and resting upon the outer surfaces of the upper and lower flanges of the center tube, and a gasket supporting assembly constituting a portion of and carried by the filter replacement unit and located at each end of the center tube and comprising a tubular cylindrical member extending into the center tube and engaging the tucked-in end of the fabric sock at each end of the center tube and provided at its outer end with an outwardly extending flange engaging over the adjacent flange of the center tube and the sock arranged thereon, an annular closure cap fitted over the cylindrical member and having a skirt crimped into engagement with the flange of the center tube and rigidly securing the tubular cylindrical member to the center tube, and a gasket contained within the closure cap and clamped between the same and the flange of the cylindrical member and having a central opening of a size to fit a center pipe of a filter casing and extending inwardly over the center tube to the center pipe and closing and sealing the space between the center tube and the center pipe at each end of the center tube when the center tube and the center pipe are assembled in spaced relation within a filter casing, and a wire withdrawal handle arranged between the flange of the upper end of the center tube and the flange of the cylindrical member and having hooked ends extending into the center tube, whereby the withdrawal handle is positively locked to the filter replacement unit.

LEON G. ALEXANDER.
JAMES W. SHERRILL.

REFERENCES CITED

The following references are of record in the file of this patent:

UNITED STATES PATENTS

| Number | Name | Date |
|---|---|---|
| 2,078,525 | Bruesewitz | Apr. 27, 1937 |
| 2,334,664 | Wicks | Nov. 16, 1943 |
| 2,367,745 | Wicks | Jan. 23, 1945 |
| 2,543,481 | Wicks et al. | Feb. 27, 1951 |